(12) United States Patent
Millauer

(10) Patent No.: US 6,385,062 B2
(45) Date of Patent: May 7, 2002

(54) DIRECT CURRENT-SUPPLYING CIRCUIT FOR INDUCTANCES

(75) Inventor: Wolfgang Millauer, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/847,797

(22) Filed: May 2, 2001

(30) Foreign Application Priority Data

May 4, 2000 (DE) .......................... 100 21 785

(51) Int. Cl.$^7$ ................................ H02M 5/45
(52) U.S. Cl. .......................... 363/37; 363/17
(58) Field of Search ..................... 363/37, 39, 40, 363/41, 45, 16, 17

(56) References Cited

U.S. PATENT DOCUMENTS

| | | | | |
|---|---|---|---|---|
| 3,710,229 A | * | 1/1973 | Jessee | ............... 363/41 |
| 4,122,515 A | * | 10/1978 | Tachibana et al. | ....... 363/45 |
| 5,303,137 A | * | 4/1994 | Peterson | ............... 363/16 |
| 6,058,026 A | * | 5/2000 | Rozman | ............... 363/16 |

\* cited by examiner

Primary Examiner—Rajnikant B. Patel
(74) Attorney, Agent, or Firm—Sidley Austin Brown & Wood, LLP

(57) ABSTRACT

Pursuant to the invention, the capacitance of the smoothing capacitor in the direct current intermediate circuit, which normally must be designed relatively large in a main supplied direct current regulator, is divided into two capacitances, of which one capacitance (K1), responsible for the smoothing, continues to bridge the direct current side of rectifier (G), while the other capacitance (K2), which absorbs the demagnetizing energy of an inductive load (L), bridges the half-bridge of the bridge circuit, which is remote from the rectifier, wherein the connecting point between the two half-bridges of the bridge circuit is decoupled from a feeding point of the intermediate circuit by an additional third diode (D3). Due to the invention, feedback effects on the electrical network are reduced and high switching-on currents can be reduced by a large smoothing capacitance, which was previously required for other reasons.

1 Claim, 1 Drawing Sheet

DIRECT CURRENT-SUPPLYING CIRCUIT FOR INDUCTANCES

FIELD OF INVENTION

The invention relates to a direct current-supplying circuit for inductances in the form of a bridge circuit with a rectifier with a smoothing capacitor over the one, first bridge diagonal and an inductive load over the other, second bridge diagonal, the two half-bridge branches, lying between the positive and the negative pole of the smoothing capacitor consisting, on the one hand, of the series connection of a first controllable rectifier cell and a first diode lying in the non-conducting direction with respect to a direction of current flow and, on the other, of a second rectifier cell or a second diode also lying in the non-conducting direction with respect to the current flow. A direct current-supplying circuit of this type is suitable particularly as a main power direct dc converter for, in principle, any inductances.

BACKGROUND INFORMATION

A circuit, known under the name of H bridge, as shown in FIG. 1, starts out from a rectified line voltage, optionally smoothened by a capacitor K, and consists of, in principle, two controlled rectifier cells, such as semiconductor switches V1 and V2, as well as two not controlled diodes D1 and D2. A so-called "intermediate circuit voltage", produced from an electrical network, is connected, as shown in FIG. 1, to a first bridge diagonal at the terminals 1 and 2. An inductive load L lies over the other bridge diagonal between the terminals 3 and 4. Any type of direct current-supplied inductance, such as a magnetic rectifier cell coil or a motor field coil, is conceivable as load L.

As is generally known, the capacitance of the smoothing capacitor K should be designed comparatively large, since this capacitor basically has two different functions. It serves, on the one hand, to decrease the waviness of the direct current obtained, which is caused by the main rectification. On the other hand, quite independently of the preceding, it has the function of absorbing the so-called "demagnetizing energy" of the load L (coil), that is, the magnetic energy fed back to the intermediate circuit over the two diodes D1, D2 each time after the two semiconductor switches V1, V2 are switched off. As a consequence of this double function, both functions or tasks must be taken into consideration during the dimensioning of the capacitor K. Even if, from the point of view of the overall function, a relatively large waviness in the intermediate circuit or even a not-smoothened intermediate circuit voltage would be acceptable or even necessary for minimizing current harmonics in the electrical network, the capacitor K can never be made smaller than necessary for absorbing the magnetic energy in the case of a still acceptable voltage increase.

In the publication DE 197 09 264 A1 (see, in particular, FIG. 1), a circuit arrangement is known for reducing the reactions on the temporal course of the current, taken from the electrical network, in an inductive load. In the case of an inductive load, for example, a motor winding over a rectifier by active filtration of the harmonics of a basic electrical network oscillation over a boost converter, for which, by a suitable pulse-width modulated control of a further, first semi-conductor switch and a capacitor, which lies parallel to the demagnetizing rectifier cell of the diode D1 and the second controlled semiconductor switch V2 of the circuit of FIG. 1, which absorbs the demagnetizing energy of the inductive load L, a diminution of an otherwise required larger so-called "Hochsetstellerdrossel" (high set adjuster choke) becomes possible. The additional capacitor exclusively has the function of storing the demagnetizing energy from the inductance on an interim basis.

OBJECT OF THE INVENTION

The invention is based upon the problem, on the one hand, of clearly reducing the electrical network feedback and, on the other hand, of clearly decreasing the size of the smoothing capacitor K.

SUMMARY OF THE INVENTION

Referring to the direct current-supplying circuit defined above, the invention is defined by the following distinguishing features comprising a direct current-supplying circuit for inductances in the form of a bridge circuit including a rectifier (G) with a smoothing capacitor over a first bridge diagonal (1, 2) and an inductive load (L) over a second bridge diagonal (3, 4), wherein the first bridge diagonal and the second bridge diagonal form two half-bridge branches lying between a positive pole and a negative pole of the smoothing capacitor and comprising a series connection of a first controllable rectifier cell (V1) and a first diode (D1) lying in a non-conducting direction with respect to a direction of current flow; and at least one of a second rectifier cell (V2) and a second diode (D2) lying in the non-conducting direction with respect to the current flow, wherein a connecting node (1) of the first bridge diagonal, connected with the positive pole of a rectifier (G), is interrupted and a decoupling diode (D3), poled in the nonconducting direction in relation to a current-flowing direction, from the positive to the negative direct current pole of the rectifier, is connected between the two half-bridge branches and wherein the smoothing capacitor is divided into two separate capacitances (K1, K2), a first of said separate capacitances (K1), a smoothing capacitor, bridges the direct current side of the rectifier (G) and a second of said separate capacitances (K2), is connected over the second half-bridge branch formed by the series connection of the second diode (D2) and the second controllable rectifier cell (V2) and serves as a capacitor for at least partially absorbing the demagnetizing energy of the inductive load (1) to reduce electrical network reactions.

In the invention, the features are such that the connecting node of the first bridge diagonal, connected with the positive pole of a rectifier, is interrupted and a decoupling diode, poled in the nonconducting direction in relation to a current-flowing direction, from the positive to the negative direct current pole of the rectifier, is connected between the two half-bridge branches, and the smoothing capacitor is divided into two separate capacitances, one of which, as smoothing capacitor, bridges the direct current side of the rectifier and the other, is connected over the second half-bridge branch formed by the series connection of the second diode and the second controllable rectifier cell and, at the same time, serves as a capacitor for absorbing, at least partially, the demagnetizing energy of the inductive load, especially to reduce electrical network reactions.

Not only does the invention have the advantage of avoiding the above-mentioned over-dimensioning of the smoothing capacitor K in the circuit arrangement of FIG. 1, but also, of better addressing the increasingly restrictive regulations concerning permissible current harmonics of the electrical network, which can be caused at least partially by such over-dimensioning.

BRIEF DESCRIPTION OF THE DRAWINGS

The invention and advantageous details are explained in greater detail in the following description, by example, and with reference to the drawing, in which.

DESCRIPTION OF THE INVENTION

Figure 1:
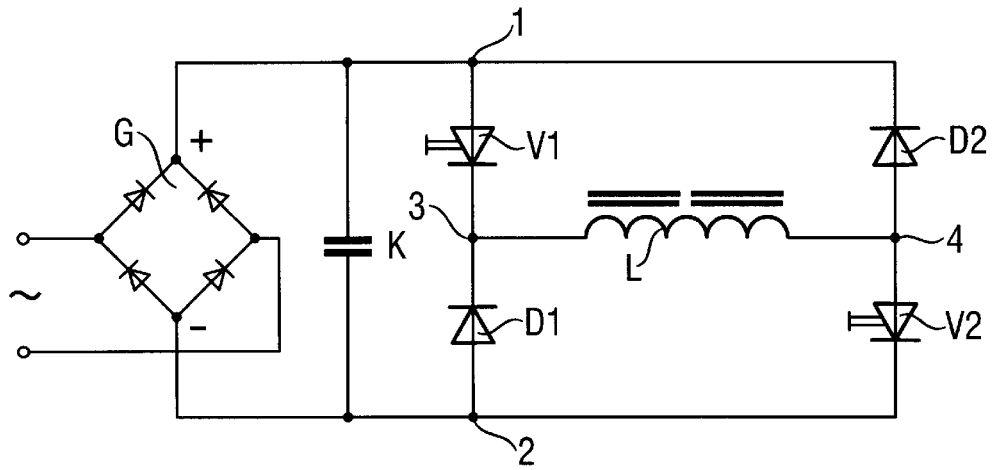
FIG. 1 shows known direct current-supplying circuit for inductances and FIG. 2 shows a modified direct current-supplying circuit for inductances configured, in accordance with the invention.
Figure 2:
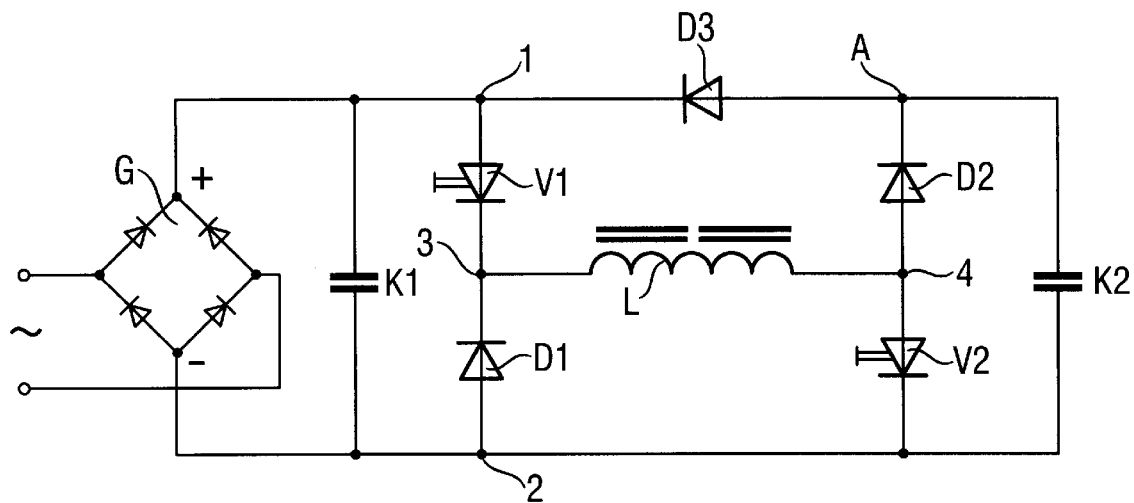

The circuit of FIG. 2, shows that the capacitor K, of FIG. 1, is divided into two capacitances K1, K2, K1, responsible for the smoothing and also for the current harmonics in the electrical network, has remained unchanged at the place of the previous capacitor K, while K2, which serves to absorb the demagnetizing energy from the inductive load L, is connected directly to the second diode D2, which is also referred to as "demagnetizing diode". K2 thus lies parallel to the second half-bridge diagonal, formed from the series connection between the second diode D2 and the second controlled semi-conductor switch V2, which are present unchanged in the polarity, which is given in FIG. 1. Furthermore, in the circuit of FIG. 2, the connection point A between the second diode D2 and the first capacitor K1 is decoupled before the entry point of the intermediate circuit by an additional third diode D3, which is referred to as the decoupling diode and is poled so that the intermediate circuit cannot supply the second capacitance K2; on the other hand, however, the capacitance of the capacitor K2 can "run over" into the intermediate circuit. By means of this inventive circuit measure, the capacitor K2, which absorbs the demagnetizing energy of the inductive load L, no longer has a smoothing function and consequently also does not cause any harmonics in the electrical network. However, this second capacitor K2 delivers the demagnetizing energy whenever the semiconductor switch V1, V2 is switched on once again and the capacitor voltage at the capacitor K1 becomes smaller than the capacitor voltage at the capacitor K2. However, due to the polarity of the third diode D3, the smoothing capacitor K1 continues to participate in the energy absorption during the demagnetizing process, but, only to the extent that the voltage at such capacitor K1 is less than the voltage at the capacitor K2.

An additional effect of the inventive circuit of FIG. 2, which is particularly advantageous for some applications, is the suppression of high switching-on currents by high smoothing capacitances of the type previously necessary for the reasons given above, so that optionally special charging circuits can be omitted.

What is claimed is:

1. A direct current-supplying circuit for inductances in the form of a bridge circuit including a rectifier (G) with a smoothing capacitor over a first bridge diagonal (1, 2) and an inductive load (L) over a second bridge diagonal (3, 4), wherein the first bridge diagonal and the second bridge diagonal form two half-bridge branches lying between a positive pole and a negative pole of the smoothing capacitor and comprising a series connection of a first controllable rectifier cell (V1) and a first diode (D1) lying in a non-conducting direction with respect to a direction of current flow; and at least one of a second rectifier cell (V2) and a second diode (D2) lying in the non-conducting direction with respect to the current flow, wherein a connecting node (1) of the first bridge diagonal, connected with the positive pole of a rectifier (G), is interrupted and a decoupling diode (D3), poled in the nonconducting direction in relation to a current-flowing direction, from the positive to the negative direct current pole of the rectifier, is connected between the two half-bridge branches and wherein the smoothing capacitor is divided into two separate capacitances (K1, K2), a first of said separate capacitances (K1), a smoothing capacitor, bridges the direct current side of the rectifier (G) and a second of said separate capacitances (K2), is connected over the second half-bridge branch formed by the series connection of the second diode (D2) and the second controllable rectifier cell (V2) and serves as a capacitor for at least partially absorbing the demagnetizing energy of the inductive load (1) to reduce electrical network reactions.

* * * * *